(12) United States Patent
Ju et al.

(10) Patent No.: US 10,439,308 B2
(45) Date of Patent: Oct. 8, 2019

(54) METHOD FOR MOLDING ELECTRICAL CONNECTOR

(71) Applicant: LOTES CO., LTD, Keelung (TW)

(72) Inventors: Ted Ju, Keelung (TW); Wen Wei Lin, Keelung (TW); Li Ming Zhang, Keelung (TW)

(73) Assignee: LOTES CO., LTD, Keelung (TW)

( * ) Notice: Subject to any disclaimer, the term of this patent is extended or adjusted under 35 U.S.C. 154(b) by 239 days.

(21) Appl. No.: 15/657,526

(22) Filed: Jul. 24, 2017

(65) Prior Publication Data

US 2017/0324175 A1  Nov. 9, 2017

Related U.S. Application Data

(63) Continuation of application No. 14/621,134, filed on Feb. 12, 2015, now Pat. No. 10,008,793.

(Continued)

(51) Int. Cl.
*H01R 13/648* (2006.01)
*H01R 12/71* (2011.01)
(Continued)

(52) U.S. Cl.
CPC .......... *H01R 12/712* (2013.01); *B29C 63/00* (2013.01); *H01R 12/00* (2013.01); *H01R 12/707* (2013.01);
(Continued)

(58) Field of Classification Search
CPC .... H01R 12/712; H01R 12/00; H01R 12/707; H01R 13/6477; H01R 13/6585; H01R 13/6594; H01R 24/00; H01R 24/60; H01R 24/78; H01R 43/18; H01R 2107/00; B29C 63/00

(Continued)

(56) References Cited

U.S. PATENT DOCUMENTS 7,670,156 B2 * 3/2010 Chen .................. H01R 13/6485
439/108
7,731,535 B1 * 6/2010 Wan ..................... H01R 12/712
439/541.5

(Continued)

OTHER PUBLICATIONS

Filing Receipt of U.S. Appl. No. 61/926,270, filed Jan 11, 2014.

*Primary Examiner* — Abdullah A Riyami
*Assistant Examiner* — Vladimir Imas
(74) *Attorney, Agent, or Firm* — Locke Lord LLP; Tim Tingkang Xia, Esq.

(57) ABSTRACT

An electrical connector configured for insertion with a mating connector, including an insulating body that has a base and a tongue extending forward from the base. The tongue has a middle portion and a mating portion. The middle portion is connected to the mating portion and the base, and the middle portion having a thickness greater than that of the mating portion. Multiple terminals are provided, and each terminal has a connection portion. The connection portions are divided into an upper row and a lower row and fixed to the middle portion. A middle shielding sheet is insert molded into the tongue and located between the connection portions in the upper low and the lower row. The middle shielding sheet has at least one first protruding portion that extends out a side edge of the middle portion.

16 Claims, 8 Drawing Sheets

Related U.S. Application Data

(60) Provisional application No. 62/024,728, filed on Jul. 15, 2014.

(51) Int. Cl.

| | | |
|---|---|---|
| *H01R 24/78* | (2011.01) | |
| *H01R 12/00* | (2006.01) | |
| *H01R 24/00* | (2011.01) | |
| *H01R 12/70* | (2011.01) | |
| *H01R 13/6594* | (2011.01) | |
| *H01R 13/6585* | (2011.01) | |
| *H01R 24/60* | (2011.01) | |
| *B29C 63/00* | (2006.01) | |
| *H01R 43/18* | (2006.01) | |
| *H01R 13/6477* | (2011.01) | |
| *H01R 107/00* | (2006.01) | |

(52) U.S. Cl.
CPC ..... *H01R 13/6477* (2013.01); *H01R 13/6585* (2013.01); *H01R 13/6594* (2013.01); *H01R 24/00* (2013.01); *H01R 24/60* (2013.01); *H01R 24/78* (2013.01); *H01R 43/18* (2013.01); *H01R 2107/00* (2013.01)

(58) Field of Classification Search
USPC ...................................................... 439/607.05
See application file for complete search history.

(56) References Cited

U.S. PATENT DOCUMENTS

| | | | | |
|---|---|---|---|---|
| 8,021,195 B2* | 9/2011 | He | ................ | H01R 13/502 439/638 |
| 8,109,795 B2* | 2/2012 | Lin | ................ | H01R 13/6461 439/660 |
| 8,465,299 B2* | 6/2013 | Ho | ................ | H01R 13/506 439/607.05 |
| 8,684,769 B2* | 4/2014 | Kao | ................ | H01R 13/6471 439/607.28 |
| 8,784,134 B2* | 7/2014 | Wu | ................ | H01R 13/6598 439/607.05 |
| 8,808,029 B2* | 8/2014 | Castillo | ................ | H01R 13/6585 439/607.05 |
| 8,851,927 B2* | 10/2014 | Hsu | ................ | H01R 12/724 439/607.11 |
| 8,956,187 B2* | 2/2015 | He | ................ | H01R 13/504 439/607.35 |
| 8,961,235 B2* | 2/2015 | Little | ................ | H01R 13/64 439/660 |
| 8,968,031 B2* | 3/2015 | Simmel | ................ | H01R 13/659 439/660 |
| 8,992,252 B2* | 3/2015 | McClellan | ................ | H01R 13/6587 439/607.05 |
| 9,022,800 B2* | 5/2015 | Yang | ................ | H01R 13/6581 439/487 |
| 9,178,319 B2* | 11/2015 | Little | ................ | H01R 13/6585 |
| 9,231,356 B1* | 1/2016 | Ju | ................ | H01R 24/78 |
| 9,257,793 B2* | 2/2016 | Lo | ................ | H01R 13/6461 |
| 9,312,641 B2* | 4/2016 | Wang | ................ | H01R 13/6585 |
| 9,490,580 B2* | 11/2016 | Lan | ................ | H01R 13/646 |
| 9,502,840 B2* | 11/2016 | Kao | ................ | H01R 24/60 |
| 9,520,681 B2 | 12/2016 | Peng et al. | | |
| 9,917,405 B2* | 3/2018 | Ju | ................ | H01R 13/6585 |
| 10,008,793 B2* | 6/2018 | Ju | ................ | H01R 24/78 |
| 10,038,260 B2* | 7/2018 | Ju | ................ | H01R 24/78 |
| 10,218,134 B2* | 2/2019 | Tsai | ................ | H01R 13/6585 |
| 2013/0273784 A1* | 10/2013 | Little | ................ | H01R 13/6271 439/660 |
| 2014/0187086 A1* | 7/2014 | Little | ................ | H01R 13/6585 439/607.34 |
| 2014/0194005 A1* | 7/2014 | Little | ................ | H01R 13/6585 439/607.28 |
| 2016/0197443 A1* | 7/2016 | Zhang | ................ | H01R 13/6585 439/607.05 |

\* cited by examiner

METHOD FOR MOLDING ELECTRICAL CONNECTOR

CROSS-REFERENCE TO RELATED APPLICATION

This application is a continuation application of U.S. application Ser. No. 14/621,134, filed Feb. 12, 2015, which itself claims priority to and benefit of, under 35 U.S.C. § 119(e), U.S. provisional patent application Ser. No. 62/024,728, filed Jul. 15, 2014, entitled "ELECTRICAL CONNECTOR," by Ted Ju. The entire contents of the above-identified applications are incorporated herein by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates to a method for molding an electrical connector, and particularly to an electrical connector molding method that ensures the true position and the high-frequency performance of terminals.

BACKGROUND OF THE INVENTION

An existing electrical connector used to transmit a high-frequency signal includes an insulating body. An upper row of terminals and a lower row of terminals are disposed in the insulating body. The number of each row of terminals is large, and the terminal is in a slender shape, and includes a flat contact portion and a soldering portion bending downward and extending from the contact portion. A middle shielding sheet is disposed between the upper row of terminals and the lower row of terminals, and used to shield electromagnetic interference between the two rows of terminals. To ensure thinness of the electrical connector, the thickness of the insulating body of this electrical connector is generally small, and all the terminals can only be densely arranged in the insulating body. A molding process of this electrical connector is as follows: first performing molding to obtain a lower-row terminal module, where the lower-row terminal module is provided with a lower insulator and lower conducting terminals; performing stamping to obtain a row of upper conducting terminals, where the head and the tail (that is, front end of contact portion and tail end of soldering portion) of the row of upper conducting terminals are each connected to a strip; then, cutting off the strip of the front end, then placing the row of upper conducting terminals and a middle shielding sheet together into a mold cavity by using the strip of the tail end, and covering the upper conducting terminals and the middle shielding sheet with an upper insulator by means of an insert-molding technique to form an upper-row terminal module; and then assembling the upper-row terminal module and lower-row terminal module together to form the electrical connector.

However, after the upper conducting terminals are obtained by means of stamping, the entire row of the upper conducting terminals is connected into a whole only by the strip of the tail end. The upper conducting terminals are all of a slender structure, the entire row of upper conducting terminals is arranged densely, and in addition, a stress is generated when the soldering portion at the tail end bends. Those easily cause one end of a terminal that is not connected to the strip to warp or deflect, resulting in that two adjacent terminals are easily approaching or even contacting each other, and the true position of the terminals is bad. Thus, during subsequent insert-molding, the entire row of upper conducting terminals is not easily placed into the mold cavity. After the entire row of upper conducting terminals is forcibly placed into the mold cavity, and when the upper row conducting terminals are clamped and positioned by the positioning pin, the terminals are easily damaged by pressing or the mold is easily damaged.

Therefore, a heretofore unaddressed need exists in the art to address the aforementioned deficiencies and inadequacies.

SUMMARY OF THE INVENTION

In one aspect, the present invention is directed to a method for molding an electrical connector that ensures a good true position of terminals, and does not damage the terminals by pressing or damage a mold in a molding process.

In one embodiment, a method for molding an electrical connector includes the following steps:

S1: providing a row of first terminals, and integrally wrapping an insulating block on the first terminals using an insert-molding technique, where the insulating block covers a part of each first terminal, and the insulating block and the row of first terminals together form a first terminal module;

S2: providing a middle shielding sheet; and

S3: integrally wrapping an insulating body around the middle shielding sheet and the first terminal module using the insert-molding technique.

In one embodiment, in the step S1, the first terminal includes a contact portion, a soldering portion, and a connection portion connecting the contact portion and the soldering portion, and the insulating block covers a part of each connection portion. In the step S3, a part of each first terminal is insert-molded in the insulating body, the contact portion is exposed from a surface of the insulating body, and the soldering portion extends out of the insulating body.

In one embodiment, in the step S3, the middle shielding sheet includes a plate-shaped main body and a soldering pin extending from a back end of the main body. The main body is insert molded in the insulating body, and the soldering pin is exposed from the insulating body.

In one embodiment, in the step S1, a front end of each first terminal is connected to a first strip, and a back end of each first terminal is connected to a second strip. After the step S1, the method further includes a step S11: separating the first strip from the front ends of the first terminals, so that the front ends of the first terminals become free ends. In the step S2, a front end of the middle shielding sheet is connected to a third strip. After the step S2, and before the step S3, the method further includes a step S21: positioning the row of first terminals above the middle shielding sheet using the second strip and the third strip. After the step S3, the method further includes a step S31: separating the second strip from the back end of the first terminals.

In one embodiment, the method of the present invention further includes a step S4: providing a row of second terminals, and integrally wrapping a plastic block on the second terminals using the insert-molding technique, where the plastic block covers a part of each second terminal, and the plastic block and a row of second terminals together form a second terminal module. The step S4 and the steps S1, S2, and S3 may not in sequence.

In one embodiment, after the step S4, the method further includes a step S5: assembling and fix the second terminal module to the insulating body formed in the step S3.

In one embodiment, the row of first terminals includes a high-speed terminal and a non-high-speed terminal, where the high-speed terminal is a differential signal terminal for transmitting a universal serial bus (USB) 3.0 signal.

In another aspect, the present invention is directed to a method for molding an electrical connector. In one embodiment, the method includes the following steps:

S1: providing a row of first terminals, where the first terminal includes a first contact portion, a first connection portion extending from a first contact portion, and a first soldering portion bending from the first connection portion; and integrally wrapping an insulating block on the first connection portions using an insert-molding technique, where the insulating block and the row of first terminals together form a first terminal module;

S2: providing a middle shielding sheet, where the middle shielding sheet includes a plate-shaped main body and a soldering pin extending from a back end of the main body; and S3: integrally wrapping an insulating body around the middle shielding sheet and the first terminal module using the insert-molding technique, where the insulating body includes a base and a tongue extending from the base, the main body is insert molded in the tongue and the base, a part of each first terminal is insert molded in the insulating body, the first contact portion is exposed from a surface of the tongue, and the first soldering portion and the soldering pin extend out of the base.

In one embodiment, in the step S1, a front end of each first contact portion is connected to a first strip, and a back end of each first soldering portion is connected to a second strip. After the step S1, the method further includes a step S11: separating the first strip from the front ends of the first contact portions, so that the front ends of the first contact portions become free ends.

In one embodiment, in the step S2, a front end of the main body of the middle shielding sheet is connected to a third strip. After the step S2, and before the step S3, the method further includes a step S21: positioning the row of first terminals above the middle shielding sheet using the second strip and the third strip. After the step S3, the method further includes a step S31: separating the second strip from the back ends of the first soldering portions.

In one embodiment, the method of the present invention further includes a step S4: providing a row of second terminals, where each of the second terminals includes a second contact portion, a second soldering portion and a second connection portion connecting the second contact portion and the second soldering portion; and integrally wrapping a plastic block on the second connection portions using the insert-molding technique, where the plastic block and the row of second terminals together form a second terminal module. The step S4 and the steps S1, S2, and S3 may not in sequence. In the step S4, a front end of each second contact portion is connected to a fourth strip, a back end of each second soldering portion is connected to a fifth strip, and side edges of two second terminals located at an outermost side of the row of second terminals are separately connected to the fifth strip. After the step S4, the method further includes a step S41: separating the fourth strip from the front ends of the second contact portions, and separating the soldering portions of the second terminals from the fifth strip, so that a front end and a back end of each second terminal become free ends, and the side edges of the two second terminals at the outermost side are kept connected to the fifth strip.

After the step S41, the method further includes a step S5: driving the second terminal module by using the fifth strip, driving, by using the third strip, the insulating body formed in the step S31, and assembling and fixing the second terminal module to the insulating body. After the step S5, the method further includes a step S6: separately removing the third strip and the fifth strip. After the step S6, the method further includes a step S7: assembling an upper shielding sheet and a lower shielding sheet to an upper surface and a lower surface of the insulating body respectively; and then, sleeving the insulating body from back to front with a shielding case, and conducting the shielding case to the upper shielding sheet and the lower shielding sheet.

In one embodiment, in the step S3, the insulating block and the insulating body are fused and bonded.

In another aspect, the present invention further provides an electrical connector configured for insertion with a mating connector. The electrical connector includes: an insulating body, having a base and a tongue extending forward from the base, the tongue having a middle portion and a mating portion, the middle portion being connected to the mating portion and the base, and a thickness of the middle portion being greater than that of the mating portion; a plurality of terminals having a plurality of connection portions, each of the terminals having one of the connection portions, and the connection portions being divided into an upper row and a lower row and fixed to the middle portion; and a middle shielding sheet, insert molded in the tongue and located between the connection portions in the upper row and the lower row, the middle shielding sheet having at least one first protruding portion extending out of a side edge of the middle portion.

In one embodiment, the at least one first protruding portion protrudes outward from a side edge of the middle shielding sheet.

In one embodiment, the middle shielding sheet is insert molded into the mating portion and the middle portion; a second protruding portion protrudes outward from a side edge of the middle shielding sheet; and the second protruding portion is located in front of the at least one first protruding portion, and extends out of a side edge of the mating portion.

In one embodiment, a first space is located between the at least one first protruding portion and the second protruding portion adjacent to each other, and the first space is exposed from the side edge of the mating portion.

In one embodiment, the side edge of the middle shielding sheet defines a second space located behind the at least one first protruding portion and embedded into the insulating body.

In one embodiment, the second space is located closer to a central line of the middle shielding sheet along a front-rear direction than the first space.

In one embodiment, an upper shielding sheet is arranged on an upper surface of the middle portion, a lower shielding sheet is arranged on a lower surface of the middle portion, the upper shielding sheet has a snap-fit portion, the lower shielding sheet has a buckling portion, the snap-fit portion and the buckling portion are snap-fitted at the side edge of the middle portion, and the at least one first protruding portion is located in front of the snap-fit portion.

In one embodiment, a shielding case covers the base, the upper shielding sheet has an elastic sheet, the elastic sheet extends to the base and urges against the shielding case, the lower shielding sheet has an urging portion, and the urging portion and the shielding case are connected by spot welding.

In one embodiment, an elongated slot is depressed from an upper surface of the middle portion, and at least one of the connection portions is exposed from the elongated slot.

In one embodiment, a contact portion extends forward from one of the connection portions, the contact portion is exposed to the mating portion, the terminals in each row comprise a pair of high-speed terminals, and a width of the contact portion of each high-speed terminal is greater than that of the a corresponding connection portion.

In one embodiment, in the pair of high-speed terminals, a distance between the two contact portions is greater than a distance between the two connection portions.

In one embodiment, a non-high-speed terminal is provided at each side of two sides of the pair of high-speed terminals, and for each of the high-speed terminals, a distance between the contact portion of the high-speed terminal and the contact portion of the non-high-speed terminal adjacent to the high speed terminal is smaller than a distance between the connection portion of the high-speed terminal and the connection portion of the non-high-speed terminal adjacent to the high speed terminal.

In one embodiment, the mating portion has a front surface, and the middle shielding sheet extends beyond the front surface.

In one embodiment, two soldering pins bend and extend from the middle shielding sheet, the two soldering pins extend out of the base, a plurality of soldering portions extends backward from the connection portions respectively, the soldering portions are arranged in two rows and extend out of the base, and the two soldering pins are located at two sides of the soldering portions in the two rows.

In one embodiment, each of the connection portions comprises a horizontal segment and a vertical segment bending down and extending from the horizontal segment; the horizontal segments are divided into two rows and fixed to the middle portion and the base; the vertical segments are divided into two rows and fixed to the base; and a bending portion bends and extends from the middle shielding sheet, and the bending portion is located between the vertical segments in the two rows.

In one embodiment, the terminals in the lower row include a grounding terminal is located at an outermost side of the terminals in the lower row; an extending portion is connected to the grounding terminal and protrudes and extends out of the middle portion; and the extending portion and the at least one first protruding portion are staggered in a front-rear direction.

In certain embodiments of the present invention, by first insert molding first connection portions of a row of first terminals in an insulating block, the row of first terminals is fixed as a whole. The insulating block plays a role of holding the first terminals, free ends of the first terminals are prevented from warping or deflecting, and two adjacent terminals can be prevented from contacting each other, so that true positions of the terminals are good. During subsequent insert-molding, the entire row of first terminals is easily placed into a mold cavity, so as to avoid damaging terminals by pressing or damaging of the mold when the first terminals are clamped and positioned by the positioning pin.

In certain embodiments, an insulating body has a base and a tongue extending forward from the base. The tongue has a middle portion and a mating portion, the middle portion is connected to the mating portion and the base, and a thickness of the middle portion is greater than that of the mating portion. Each of the terminals has a connection portion, and the connection portions are divided into an upper row and a lower row and fixed to the middle portion. A middle shielding sheet is insert molded into the tongue and located between the two rows of connection portions, the middle shielding sheet has at least one first protruding portion, and the at least one first protruding portion extends out of a side edge of the middle portion. Thus, in an insert-molding process, a mold presses and supports the at least one first protruding portion, such that the middle parts of two sides of the middle shielding sheet are supported, thereby preventing the middle shielding sheet from being pressed to be damaged or punched to be deviated by high-mold-pressure fused plastics in a mold cavity and be inaccurately positioned. Accordingly, the electrical connector is excellent in electrical performance.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
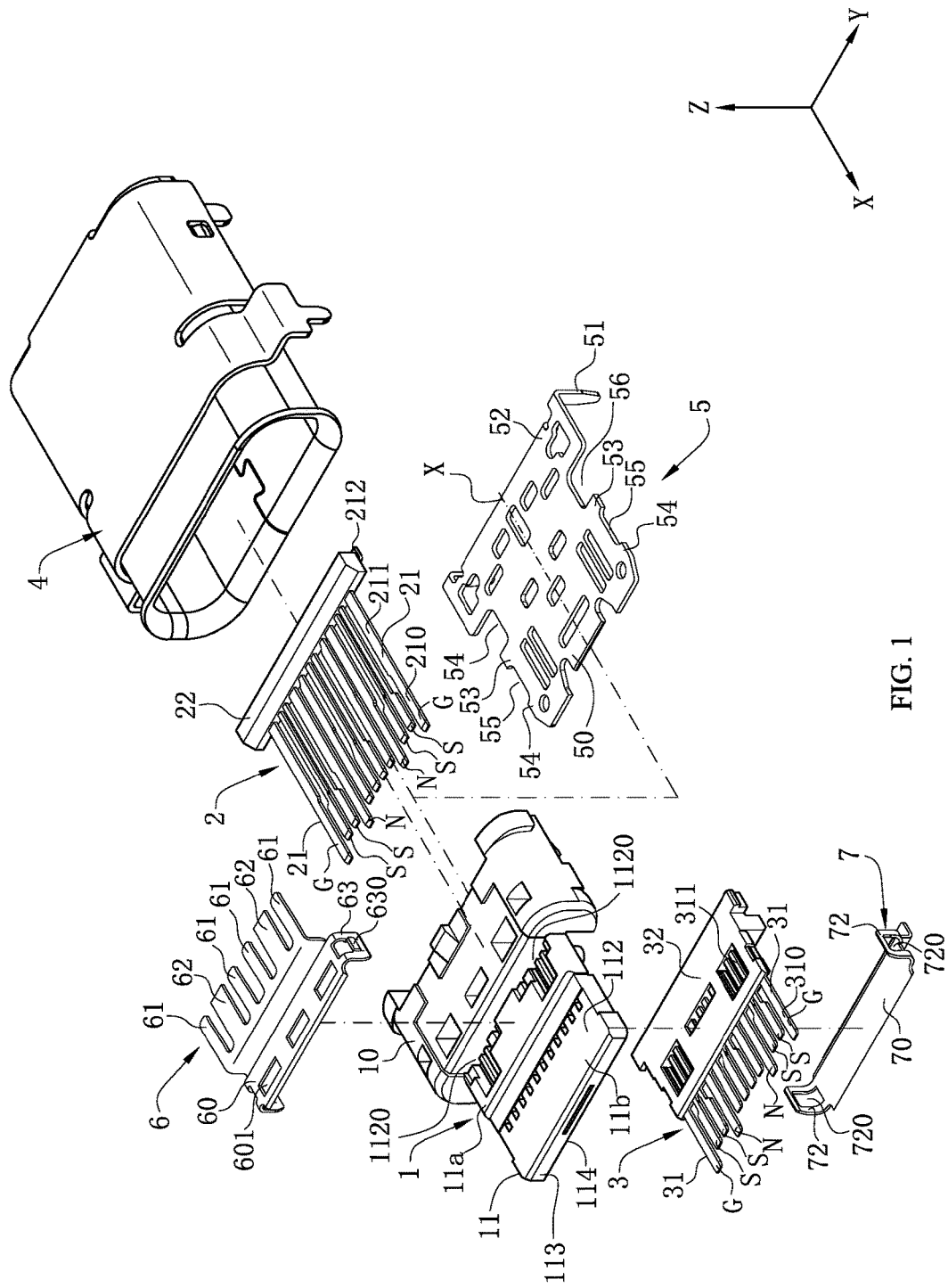
FIG. 1 is a schematic exploded view of an electrical connector according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-8. In accordance with the purposes of this invention, as embodied and broadly described herein, this invention, in one aspect, relates to a method for molding an electrical connector.

As shown in FIG. 1 to FIG. 4, an electrical connector molded using a method according to certain embodiments of the present invention includes an insulating body 1, a first terminal module 2 and a second terminal module 3 which are vertically disposed, and a shielding case 4 wrapping the insulating body 1, the first terminal module 2 and the second terminal module 3.

Figure 2:
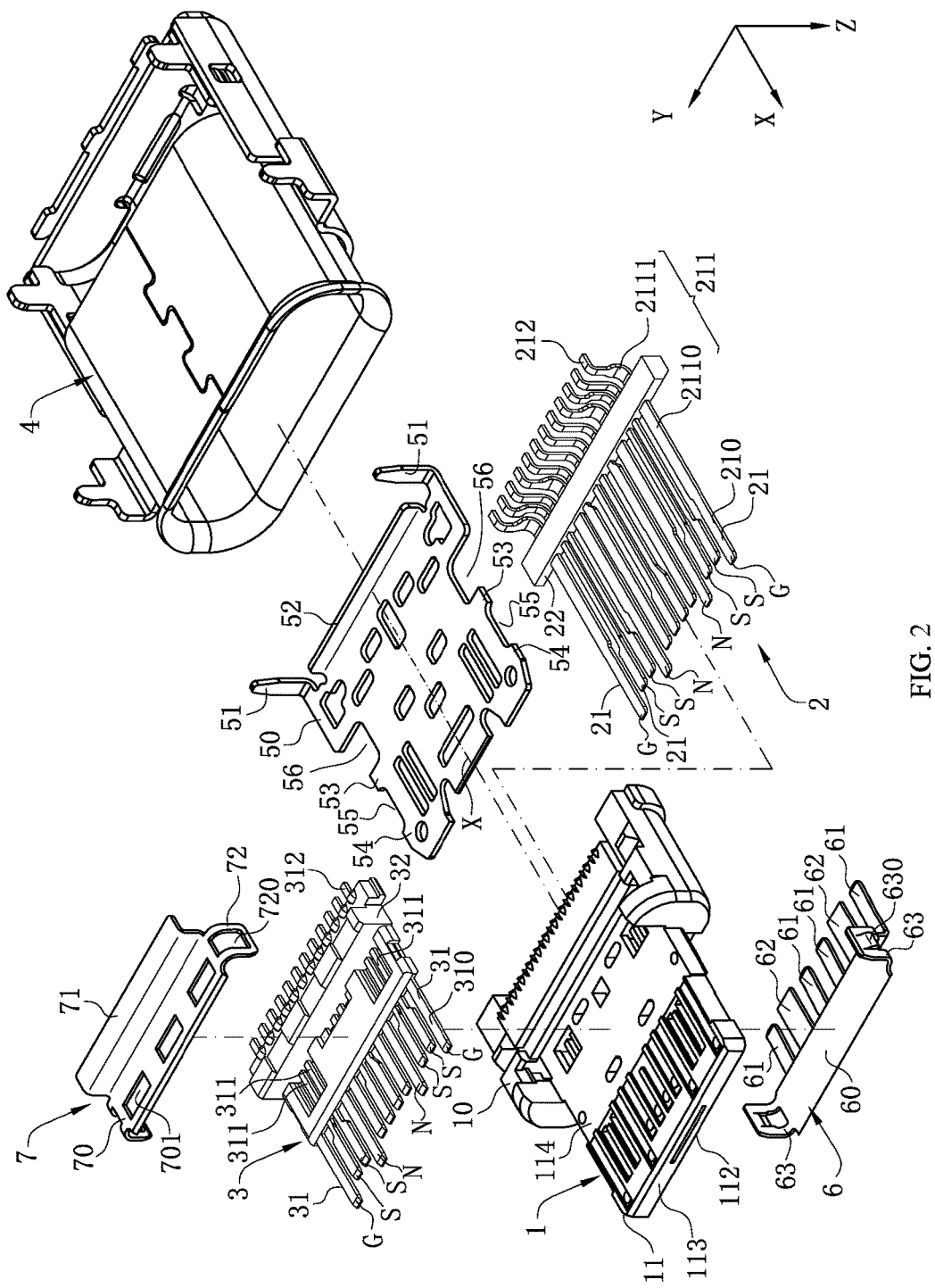
FIG. 2 is a schematic view of FIG. 1 viewed from another angle.

Referring to FIG. 1 and FIG. 2, the insulating body 1 is made of a plastic material, and includes a base 10 and a tongue 11 extending forward from the base 10. A back end of the tongue 11 has a middle portion 11*a* connected to the base 10 and a mating portion 11*b* extending forward from the middle portion 11*a*. The thickness of the base 10 in a vertical direction is greater than the thickness of the tongue 11. The entire tongue 11 is rectangular along a front-rear direction, and the tongue 11 has an upper surface 112 and a lower surface 114 opposite to each other, and a front surface 113 is connected to the upper surface 112 and the lower surface 114. The tongue 11 further has a left-right direction perpendicular to the front-rear direction and the vertical direction. For convenience of understanding, as shown in a three-dimensional coordinate system in FIG. 1, the axis X denotes a forward direction, the axis Y denotes a direction toward the right, and the axis Z denotes an upward direction.

A row of first terminals 21 and a row of second terminals 31 that are vertically and symmetrically arranged. Each row of the row of first terminals 21 and the row of second terminals 31 includes high-speed terminals and non-high-speed terminals. Specifically, each row of the row of first terminals 21 and the row of second terminals 31 is sequentially from left to right as follows: a grounding terminal G (non-high-speed terminal), a pair of differential signal terminals S (high-speed terminals) for transmitting a USB 3.0 signal, a power supply terminal N (non-high-speed terminal), a reserved terminal, a pair of USB 2.0 terminals, a reserved terminal, a power supply terminal N (non-high-speed terminal), a pair of differential signal terminals S (high-speed terminals) for transmitting a USB 3.0 signal, and a grounding terminal G (non-high-speed terminal).

The first terminal 21 and the second terminal 31 are both made of a metal plate material and stamped into a slender shape. Each first terminal 21 includes a first contact portion 210, a first connection portion 211 extending from the first contact portion 210, and a first soldering portion 212 bending from an end of the first connection portion 211. The first connection portion 211 includes a horizontal segment 2110 extending horizontally backward from a back end of the first contact portion 210 and a vertical segment 2111 bending downward from the horizontal segment 2110. Multiple first terminals 21 are fixed into a row by using an insulating block 22, and the insulating block 22 and the row of first terminals 21 together form the first terminal module 2. The insulating block 22 is in a long strip shape, and wraps a part of each first connection portion 211 by insert molding. Specifically, the insulating block 22 wraps a part of the horizontal segment 2110. The first terminal module 2 as a whole is further insert molded in the insulating body 1, and a part of the first terminal 21 is insert molded in the insulating body 1. More specifically, the first contact portion 210 is exposed from the surface of the tongue 11. Further, the first contact portion 210 is exposed from the upper surface 112 of the mating portion 11*b*, and the first connection portion 211 is partially embedded in the middle portion 11*a*. An elongated slot 1120 is concavely provided on the upper surface 112 of the middle portion 11*a*, and the elongated slot 1120 exposes the first connection portion 211. The first soldering portion 212 extends out of the base 10, and the first soldering portions 212 are arranged in a row. In each differential signal terminal S of the first terminals 21, the width of the first contact portion 210 is greater than that of the first connection portion 211. The distance between the first contact portion 210 of one differential signal terminal S and the first contact portion 210 of the adjacent differential signal terminal S is greater than the distance between the first connection portion 211 of one differential signal terminal S and the first connection portion 211 of the adjacent differential signal terminal S. In the first terminals 21, the distance between the first contact portion 210 of the grounding terminal G and the first contact portion 210 of the adjacent differential signal terminal S is smaller than the distance between the first connection portion 211 of the grounding terminal G and the first connection portion 211 of the adjacent differential signal terminal S, and the distance between the first contact portion 210 of the power supply terminal N and the first contact portion 210 of the adjacent differential signal terminal S is smaller than the distance between the first connection portion 211 of the power supply terminal N and the first connection portion 211 of the adjacent differential signal terminal S.

Likewise, each second terminal 31 includes a second contact portion 310, a second connection portion 311 extending from the second contact portion 310, and a second soldering portion 312 bending from an end of the second connection portion 311. The second connection portion 311 includes a horizontal segment (not shown) extending backward horizontally from a back end of the second contact portion 310 and a vertical segment (not shown) bending downward from the horizontal segment (not shown). Multiple second terminals 31 are fixed into a row using a plastic block 32, and the plastic block 32 and the row of second terminals 31 together form the second terminal module 3. The plastic block 32 is in a long strip shape, and wraps each second connection portion 311 by insert molding. Specifically, the plastic block 32 almost wraps the entire horizontal segment and vertical segment. A front end of the plastic block 32 wraps the horizontal segment, a back end of the plastic block 32 wraps the horizontal segment and the vertical segment, and the thickness of the back end of the plastic block 32 is greater than that of the front end of the plastic block 32.

In each differential signal terminal S of the second terminals 31, the width of the second contact portion 310 is greater than that of the second connection portion 311. The distance between the second contact portion 310 of one differential signal terminal S and the second contact portion 310 of the adjacent differential signal terminal S is greater than the distance between the second connection portion 311 of one differential signal terminal S and the second connection portion 311 of the adjacent differential signal terminal S. In the second terminals 31, the distance between the second contact portion 310 of the grounding terminal G and the second contact portion 310 of the adjacent differential signal terminal S is smaller than the distance between the second connection portion 311 of the grounding terminal G and the second connection portion 311 of the adjacent differential signal terminal S, and the distance between the second contact portion 310 of the power supply terminal N and the second contact portion 310 of the adjacent differential signal terminal S is smaller than the distance between the second connection portion 311 of the power supply terminal N and the second connection portion 311 of the adjacent differential signal terminal S.

Figure 3:
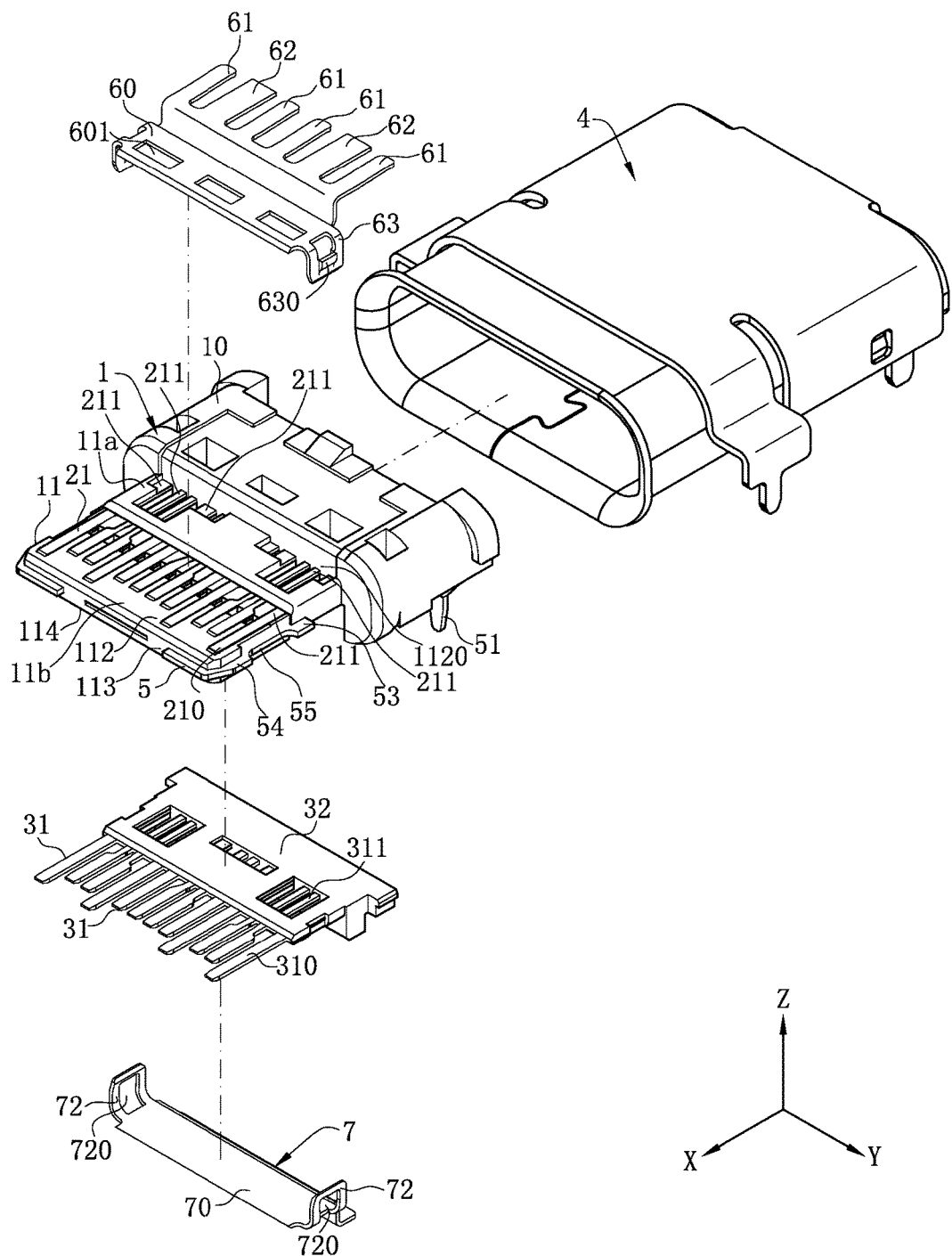
FIG. 3 is a schematic view in which a row of first terminals is fixed to an insulating body in FIG. 1.

Referring to FIG. 1, FIG. 2 and FIG. 3, the electrical connector of this embodiment further includes a middle shielding sheet 5. The middle shielding sheet 5 and the first terminal module 2 are together insert molded in the insulating body 1, and exposed from the front surface 113, and the second terminal module 3 is assembled to the lower surface of the insulating body 1 from bottom upward from the bottom of the insulating body 1, and is tightly locked to the lower surface of the insulating body 1. The middle shielding sheet 5 is located between the first terminal module 2 and the second terminal module 3 in the vertical direction.

Figure 8:
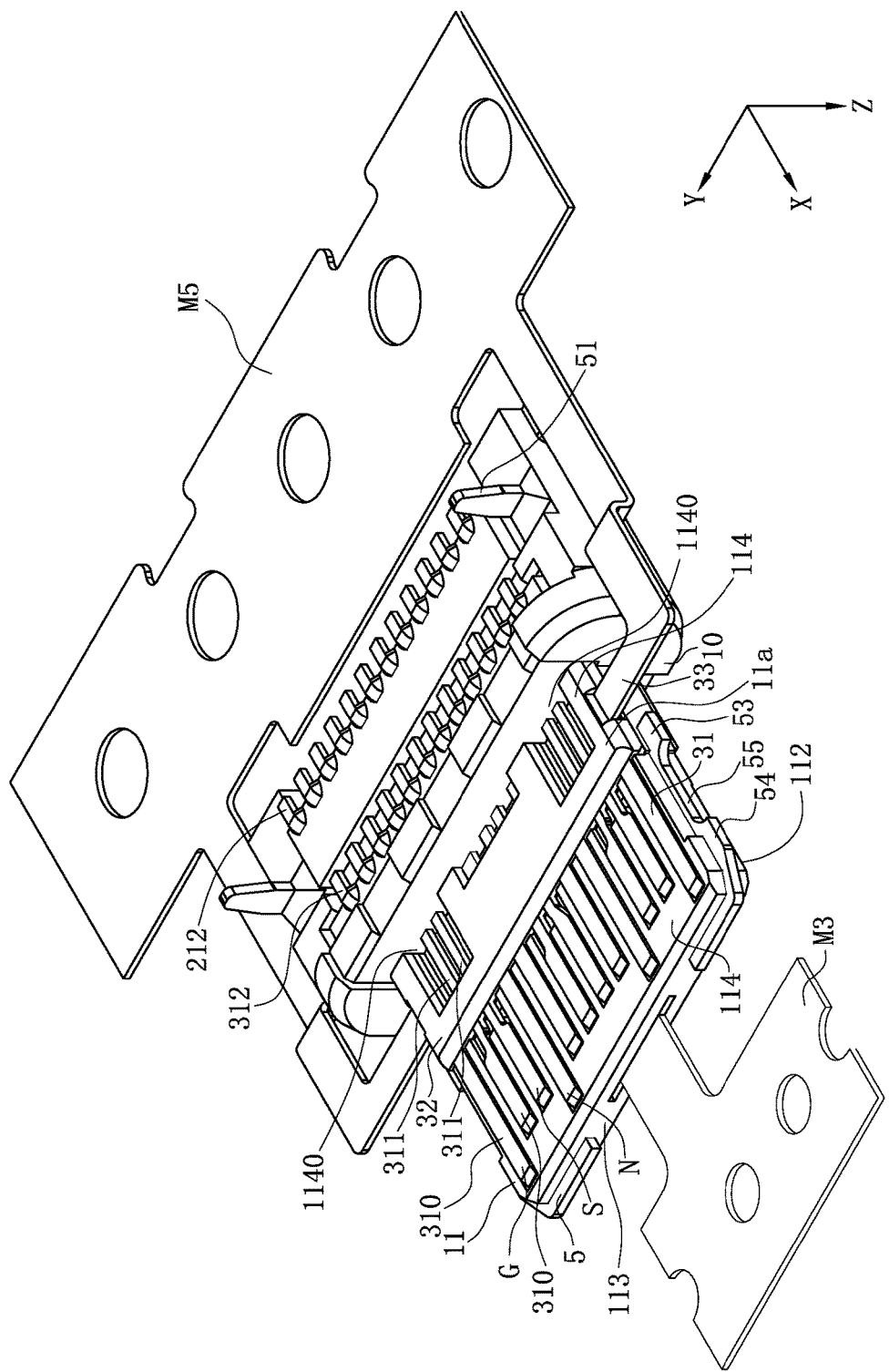
FIG. 8 is a schematic view in which the insulating body in FIG. 6 and the second terminal module in FIG. 7 are assembled together.

Referring to FIG. 2, FIG. 3 and FIG. 8, the front end of the plastic block 32 is assembled below the tongue 11, and the front end of the plastic block 32 is arranged below the back end of the tongue 11 to form the middle portion 11a, such that the thickness of the middle portion 11a is greater than that of the mating portion 11b. The back end of the plastic block 32 is arranged below the base 10 to form the base 10, and the thicknesses of the base 10, the middle portion 11a and the mating portion 11b are increased from the front to the rear. The second contact portion 310 is exposed from the lower surface 114 of the mating portion 11b, and the second connection portion 311 is partially embedded in the middle portion 11a. An elongated slot 1120 is concavely provided on the lower surface 114 of the middle portion 11a, and the elongated slot 1120 is exposed from the second connection portion 311. The second soldering portion 312 extends out of the base 10. The second soldering portions 312 are arranged in a row, and the second soldering portions 312 in one row are located in front of the first soldering portions 211 in one row.

The middle shielding sheet 5 is made of a metal material, and includes a main body 50 which is rectangular along the front-rear direction, and two soldering pins 51 separately bending downward and extending from a back end of the main body 50. The two soldering pins 51 are located at two sides of the row of first soldering portions 211 and the row of second soldering portions 312. The soldering pins 51 are used for conducting a grounding path in a circuit board (not shown). A bending portion 52 further bends downward and extends from the center of the back end of the main body 50, and the bending portion 52 is located between the two soldering pins 51, and is at a distance from the soldering pins 51. The main body 50 is insert molded into the insulating body 1, and is also insert molded into the middle portion 11a, the mating portion 11b and the base 10. The main body 50 of the middle shielding sheet 5 is located between a row of first contact portions 210 and a row of second contact portions 310, and also extends to a position between the first connection portion 211 and the second connection portion 311, and the bending portion 52 is located between the vertical segment 2111 of the first terminal 21 and the vertical segment of the second terminal 31. The soldering pins 51 are exposed from the insulating body 1. Specifically, the soldering pins 51 extend out of the base 10, and are used for being soldered to the circuit board and conducting an interference signal to the grounding path on the circuit board. In such configuration, the middle shielding sheet 5 can fully shield an interference signal between the first terminals 21 and the second terminals 31, so as to alleviate crosstalk in a signal transmission process. A first protruding portion 53 and a second protruding portion 54 extend outward from a side edge of the main body 50, the second protruding portion 54 is located in front of the first protruding portion 53, the first protruding portion 53 protrudes out of the side edge of the middle portion 11a, and the second protruding portion 54 protrudes out of the side edge of the mating portion 11b. A first space 55 is located between the first protruding portion 53 and the second protruding portion 54 adjacent to each other, and the first space 55 is exposed from the side edge of the tongue 11. The side edge of the main body 50 has a second space 56, the second space 56 is located behind the first protruding portion 53, the second space 56 is closer to a central line X of the middle shielding sheet 5 along a front-rear direction than the first space 55, and the second space 56 is insert molded into the insulating body 1. The first protruding portion 53 protrudes and extends out of the side edge of the middle portion 11a and is used for making it convenient for a mold to clamp the first protruding portion 53 in an insert-mold process, and when plastics are injected into a mold cavity to form the mating portion 11b, the middle portion 11a and the base 10, the middle shielding sheet 5 maintains a clamping balance under a high mold pressure of the plastics. The second protruding portion 54 protrudes out of the side edge of the mating portion 11b, and protects the side surface of the tongue 11.

The second space 56 is insert molded into the insulating body 1, thus increasing the bonding area of the middle shielding sheet 5 and the insulating body 1, increasing the bonding force between the middle shielding sheet 5 and the insulating body 1, and aiding in steady bonding of the middle shielding sheet 5 and the insulating body 1.

Figure 4:
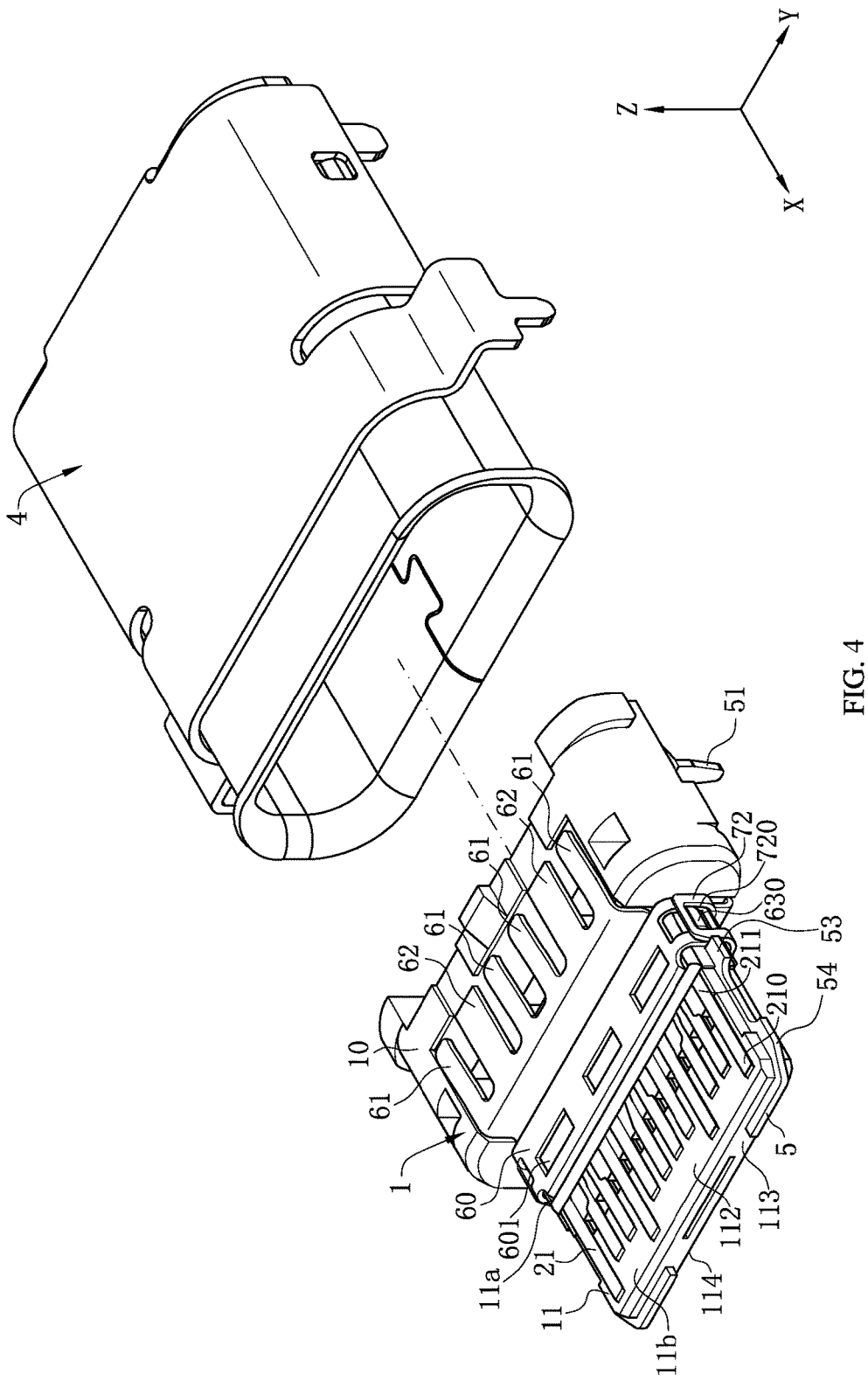
FIG. 4 is a schematic view in which a row of second terminals is assembled to the insulating body, and upper and lower shielding sheets are fixed to the insulating body in FIG. 3.

As shown in FIG. 3 and FIG. 4, the electrical connector of this embodiment further includes an upper shielding sheet 6, a lower shielding sheet 7, and a shielding case 4 sleeving the insulating body 1 from back to front. The upper shielding sheet 6 and the lower shielding sheet 7 are respectively laminated to an upper surface and a lower surface of the insulating body 1, and the upper shielding sheet 6 and the lower shielding sheet 7 are assembled and connected to each other. Specifically, the upper shielding sheet 6 is laminated to the upper surface 112 of the tongue 11. The upper shielding sheet 6 includes a flat plate portion 60 covering the rear segment of the upper surface 112 of the tongue 11. More specifically, the flat plate portion 60 covers the upper surface 112 of the middle portion 11a. Four elastic arms 61 extend backward from the flat plate portion 60. The elastic arms 61 are located above the base 10 and urge against the shielding case 4 upward elastically. Moreover, two material connection portions 62 further extend backward from the flat plate portion 60, so as to provide convenience for assembly of the upper shielding sheet 6. Multiple depressed portions 601 are depressed downward from the flat plate portion 60 and used for snap-fitting a grounding elastic sheet (not shown) in a matting connector (not shown). A snap-fit portion 63 bends downward from each of two ends of the flat plate portion 60 and covers the side edge of the tongue 11. More specifically, the snap-fit portion 63 wraps the side edge of the middle portion 11a and is located behind the first protruding portion 53, and a protruding block 630 protrudes from the snap-fit portion 63 toward the outside. The lower shielding sheet 7 is laminated to the lower surface of the plastic block 32.

The lower shielding sheet 7 includes a plate-shaped portion 70 covering the rear segment of the lower side of the tongue 11, and an urging portion 71 extending backward from the plate-shaped portion 70. The urging portion 71 is located below the base 10 and urges against the shielding case 4. Likewise, multiple depressed portions 701 are depressed upward from the plate-shaped portion 70 and used for snap-fitting a grounding elastic sheet (not shown) in a mating connector (not shown). A buckling portion 72 bends upward from each of two ends of the plate-shaped portion 70 and covers the side edge of the tongue 11. More specifically, the buckling portion 72 wraps the side edge of the middle portion 11a and is located behind the first protruding portion 53. The buckling portion 72 is provided with a through-hole 720 correspondingly snap-fitting the protruding block 630 on the upper shielding sheet 6. The first protruding portion 53 is located in front of the snap-fit portion 63 and the buckling portion 72, and limits the snap-fit portion 63 and the buckling portion 72 from shifting forward, so the flat plate portion 60 and the plate-shaped portion 70 cannot shift forward, thus avoiding a short circuit caused by contact with the first terminal 21 and the second terminal 31. To further ensure contact between the lower shielding sheet 7 and the shielding case 4, the shielding case 4 and the lower shielding sheet 7 are connected by spot welding.

Figure 5:
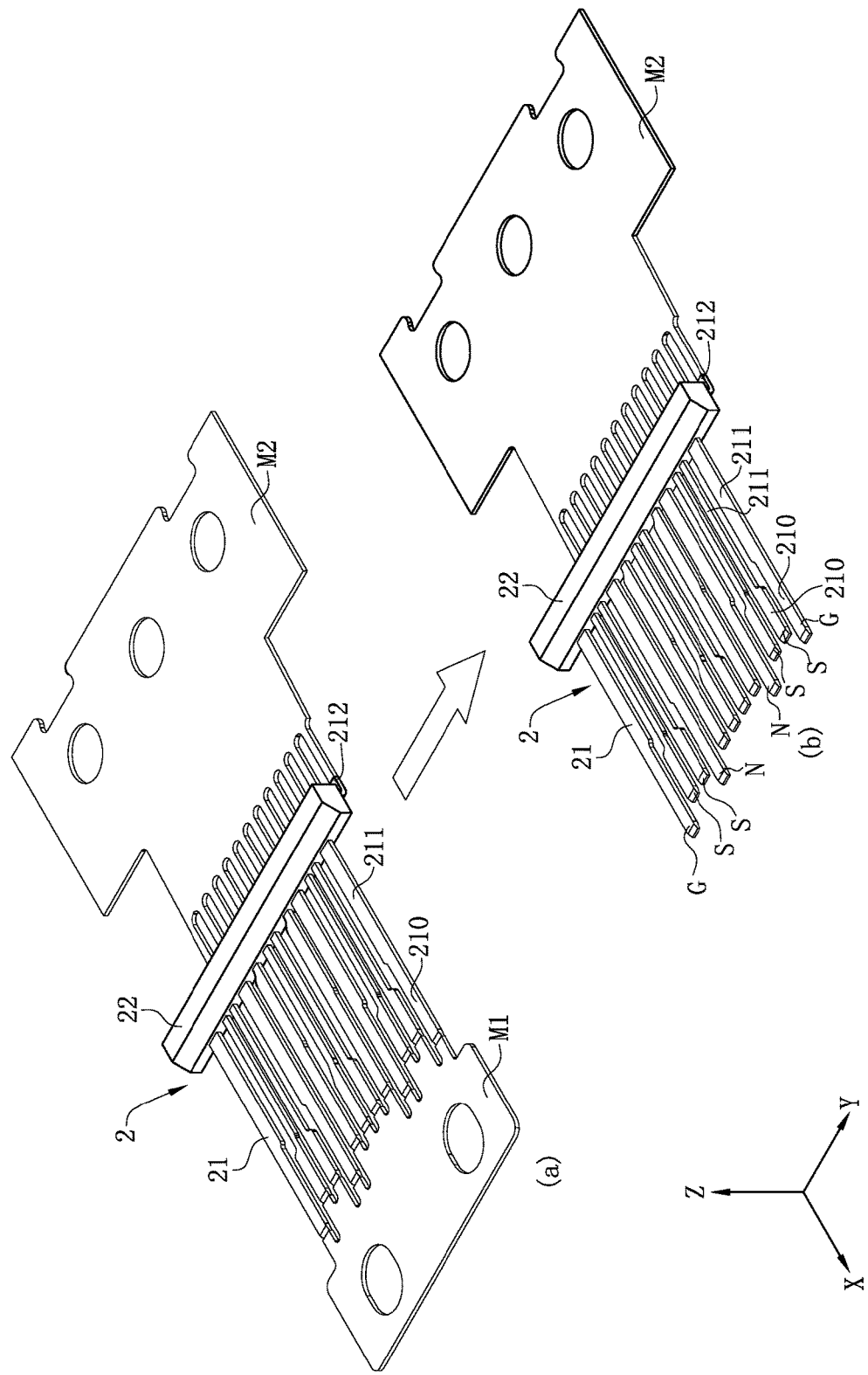
FIG. 5 is a flowchart of molding a first terminal module according to one embodiment of the present invention.

Referring to FIG. 5 to FIG. 8, a method for molding an electrical connector according to certain embodiments of the present invention includes the following steps:

Step S1: providing a row of first terminals 21, where each of the first terminals 21 includes a first contact portion 210, a first connection portion 211 extending from the first contact portion 210, and a first soldering portion 212 bending from the first connection portion 211; and integrally wrapping an insulating block 22 on the first connection portions 211 by insert molding, where the insulating block 22 and the row of first terminals 21 together form a first terminal module 2. As shown in FIG. 5 (a), a front end of each first contact portion 210 is connected to a first strip M1, and a back end of each first soldering portion 212 is connected to a second strip M2.

Then, perform step S11: separating the first strip M1 from the front ends of the first contact portions 210, so that the front ends of the first contact portions 210 become free ends, as shown in FIG. 5 (b).

Figure 6:
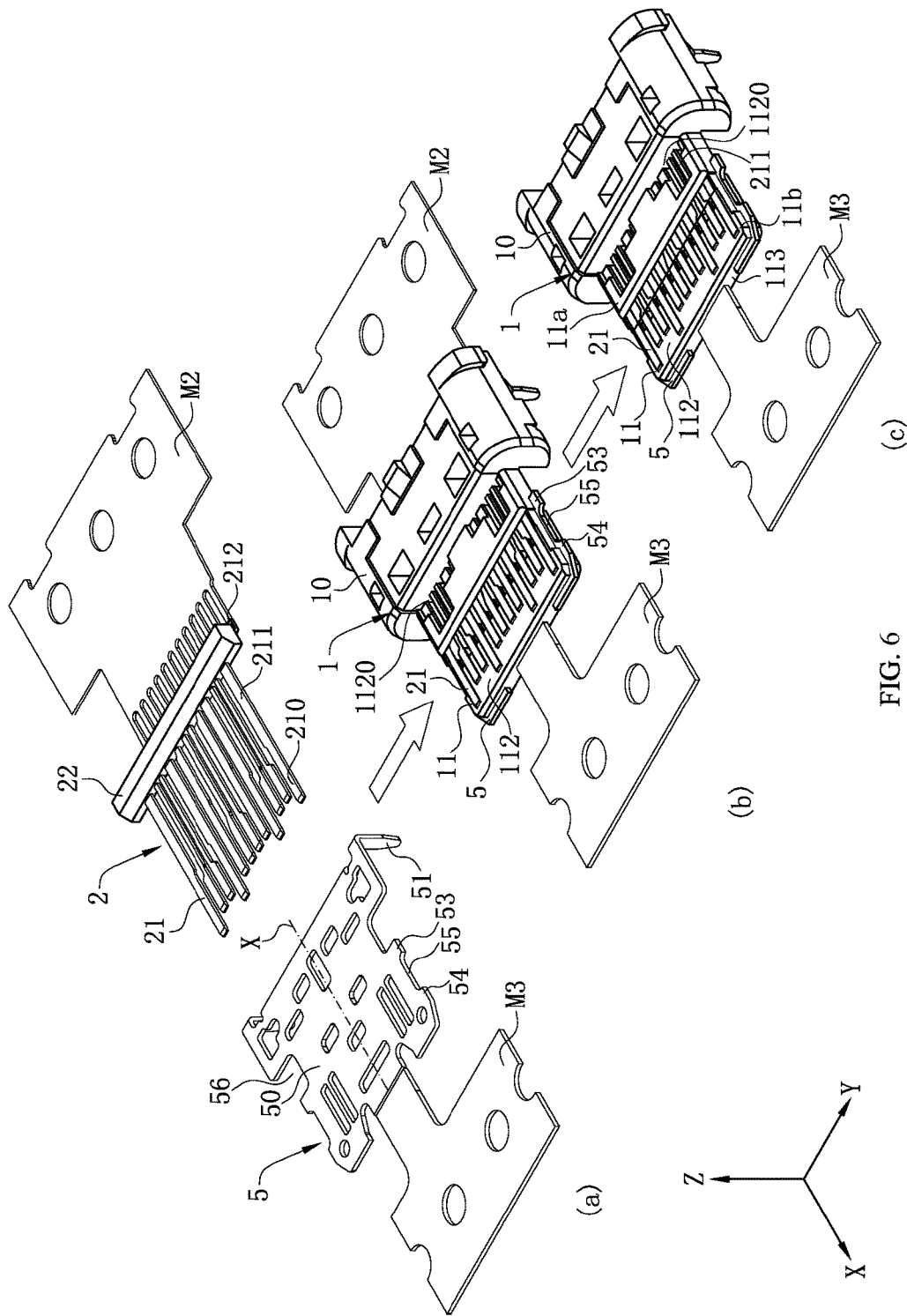
FIG. 6 is a flowchart of insert-molding the first terminal module and a middle shielding sheet together to the insulating body according to one embodiment of the present invention.

Then, perform step S2: providing a middle shielding sheet 5, where the middle shielding sheet 5 includes a plate-shaped main body 50 and two soldering pins 51 extending from a back end of the main body 50, and a front end of the main body 50 is connected to a third strip M3, as shown in FIG. 6 (a).

Then, perform step S21: moving the row of first terminals 21 using the second strip M2, moving the middle shielding sheet 5 using the third strip M3, and positioning the row of first terminals 21 above the middle shielding sheet 5.

Then, perform step S3: integrally wrapping an insulating body 1 around the middle shielding sheet 5 and the first terminal module 2 by insert molding, where the insulating body 1 includes a base 10 and a tongue 11 extending from the base 10, the main body 50 is insert molded in the tongue 11 and the base 10, a part of each first terminal 21 is insert molded in the insulating body 1, the first contact portions 210 are exposed from a surface of the tongue 11, and the first soldering portions 212 and the soldering pins 51 extend out of the base 10. The structure is specifically shown in FIG. 6 (b). In this process, the insulating block 22 and the insulating body 1 are fused and bonded.

Then, perform step S31: separating the second strip M2 from the back ends of the first soldering portions 212, as shown in FIG. 6 (c).

Figure 7:
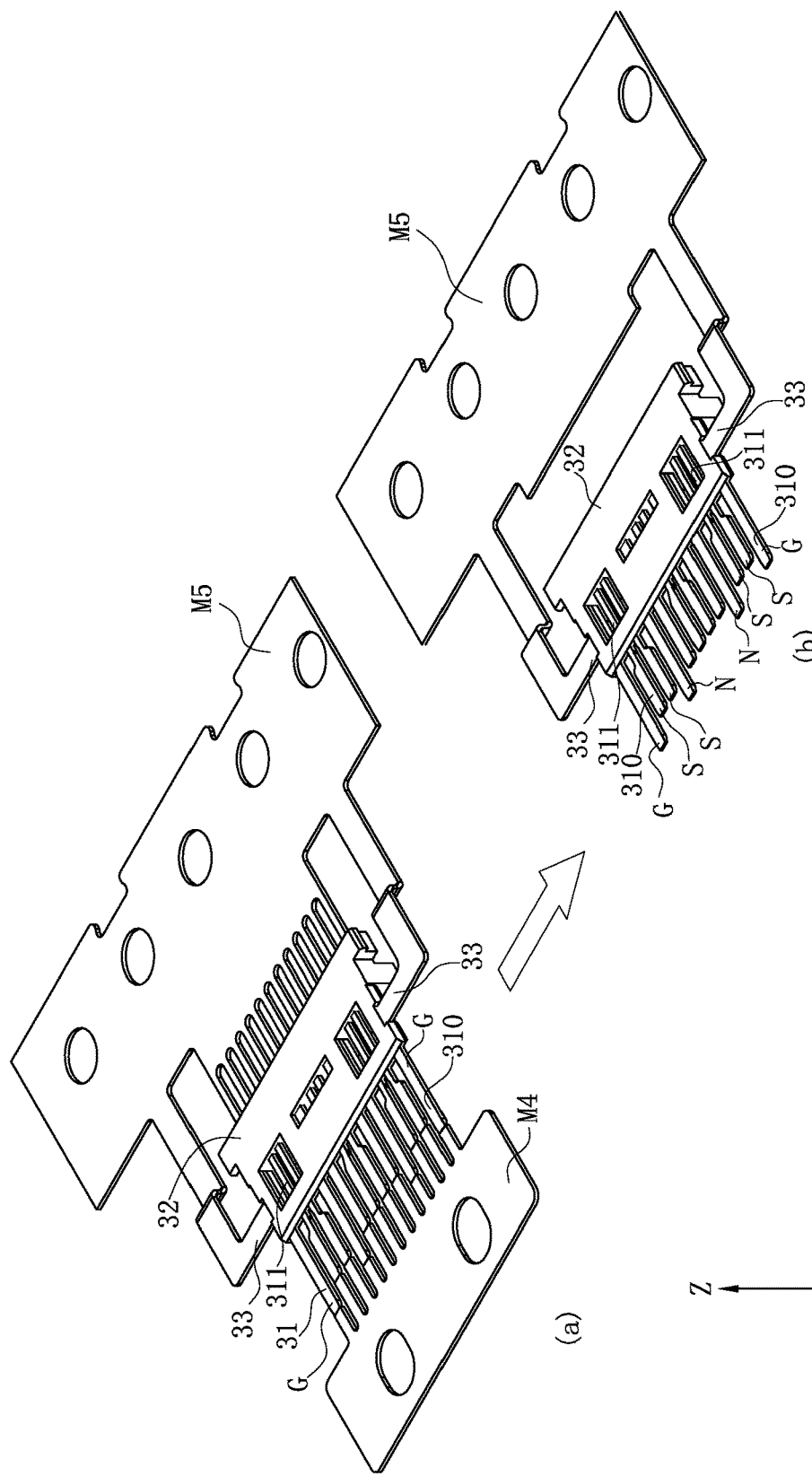
FIG. 7 is a flowchart of molding a second terminal module according to one embodiment of the present invention.

In certain embodiments, the method of the present invention further includes step S4: providing a row of second terminals 31, where each of the second terminals 31 includes a second contact portion 310, a second soldering portion 312 and a second connection portion 311 connecting the second contact portion 310 and the second soldering portion 312; and integrally wrapping a plastic block 32 on the second connection portion 311 by insert molding, where the plastic block 32 and the row of second terminals 31 together form a second terminal module 3. As shown in FIG. 7 (a), a front end of each second contact portion 310 is connected to a fourth strip M4, a back end of each second soldering portion 312 is connected to a fifth strip M5, and side edges of two second terminals 31 located at the outermost side of the row of second terminals 31 are separately connected to the fifth strip M5. That is, an extending portion 33 is connected to a side edge of each grounding terminal G of the row of second terminals 31, the extending portion 33 protrudes out of the middle portion 11a and is connected to the fifth strip M5, and the extending portion 33 and the first protruding portion 53 are staggered in the front-rear direction, as shown in FIG. 8. The extending portion 33 is connected to the grounding terminal G at the outermost side of the lower row of second terminals 31 and the fifth strip M5, such that in an insert-molding process of the second terminals 31 and the plastic block 32, the second terminals 31 are fixed by fixing the fifth strip M5. Therefore, the second terminals 31 can be well positioned on the plastic block 32.

After step S4, perform step S41: separating the fourth strip M4 from the front ends of the second contact portions 310, and separating the soldering portions 312 of the second terminals 31 from the fifth strip M5, so that front ends and back ends of the second terminals 31 become free ends, and the side edges of the two second terminals 31 at the outermost side are kept connected to the fifth strip M5, as shown in FIG. 7 (b). It should be noted that, the process (including step S4 and step S41) shown in FIG. 7 is performed using an additional mold, and therefore can be performed simultaneously with steps shown in FIG. 5 and FIG. 6 or the process and the steps are not performed in sequence.

After step S41 is performed to obtain the structure shown in FIG. 7 (b), perform step S5: driving the second terminal module 3, that is, the structure shown in FIG. 7 (b), by using the fifth strip M5, and driving the insulating body 1 formed in step S31, that is, the structure shown in FIG. 6 (c), by using the third strip M3, so as to assemble and fix the second terminal module 3 to the insulating body 1, to obtain the structure shown in FIG. 8.

Then, perform step S6: separately removing the third strip M3 and the fifth strip M5.

Then, perform step S7: assembling an upper shielding sheet 6 and a lower shielding sheet 7 to an upper surface and a lower surface of the insulating body 1 respectively; and finally, sleeving the insulating body 1 with a shielding case 4 from back to front, and conducting the shielding case 4 to the upper shielding sheet 6 and the lower shielding sheet 7.

The molding method according to certain embodiments of the present invention, among other things, has the following beneficial advantages:

1. The middle shielding sheet 5 and the first terminal module 2 are together insert molded in the insulating body 1, and the middle shielding sheet 5 is insert molded into the mating portion 11b, the middle portion 11a and the base 10, and has a first protruding portion 53 extending out of the side surface of the middle portion 11a. In an insert-molding process, the first protruding portion 53 is pressed by a mold and used for supporting two sides of the middle shielding sheet 5, so the middle shielding sheet 5 cannot be pressed to be damaged or punched to be deviated by high-mold-pressure fused plastics in a mold cavity and cannot be inaccurately positioned, and accordingly the electrical connector is excellent in electrical performance. Moreover, the first protruding portion 53 is pressed from two sides of the middle position of the insulating body 1, that is, two sides of the middle portion 11a, so in a molding process of the insulating body 1, two sides of the middle shielding sheet 5 can keep supported in balance, deviation is not easily caused, accurate positioning is achieved, and accordingly the electrical connector is excellent in electrical performance.

2. The snap-fit portion 63 wraps the side edge of the middle portion 11a and is located behind the first protruding portion 53, the buckling portion 72 wraps the side edge of the middle portion 11a and is located behind the first protruding portion 53, and the buckling portion 72 is provided with a through-hole 720 correspondingly snap-fitting the protruding block 630 on the upper shielding sheet 6. The first protruding portion 53 is located in front of the snap-fit portion 63 and the buckling portion 72, and limits the snap-fit portion 63 and the buckling portion 72 from shifting forward, so the flat plate portion 60 and the plate-shaped portion 70 cannot shift forward, thus avoiding a short circuit caused by contact with the first terminal 21 and the second terminal 31.

3. The middle shielding sheet 5 extends out of the front surface 113. When false insertion or improper mating exists between the electrical connector and the mating connector, a part, extending out of the front surface 113, of the middle shielding sheet 5 can protect the tongue 11 to prevent the tongue 11 from being damaged by false insertion to influence the electrical connection performance.

4. In certain embodiments of the present invention, first connection portions 211 of a row of first terminals 21 are first insert molded in an insulating block 22 to form a first terminal module 2, and then the first terminal module 2 and a middle shielding sheet 5 are insert molded together, so that the row of first terminals 21 is fixed as a whole. The insulating block 22 plays a role of holding the first terminal 21, free ends of the first terminals 21 can be prevented from warping or deflecting, the true position of the terminals is good, the risk of mutual contact of two adjacent first terminals 21 can be reduced. This also provides convenience for placing the entire row of first terminals 21 into a mold cavity when the first terminal module 2 and the middle shielding sheet 5 are insert molded together subsequently, so as to avoid that the terminal is damaged after being pressed or a mold is damaged when the first terminals 21 are clamped and positioned by positioning pin. Likewise, a row of second terminals 31 is insert molded in a plastic block 32, and free ends of the second terminals 31 can also be prevented from warping or deflecting, thereby preventing two adjacent second terminals 31 from contacting each other, so as to ensure the true position of the terminal.

5. In certain embodiments of the present invention, a molding manner includes insert molding both the middle shielding sheet 5 and a row of first terminals 21 into the tongue 11, and assembling a row of second terminals 31 to the lower surface of the insulating body 1. Compared with a manner in which both an upper row of terminals and a lower row of terminals are fixed to the tongue 11 in an assembly manner, the molding manner of the present invention can ensure the strength of the tongue 11 (because the tongue 11 needs to be thinned or slotted when the upper and lower terminal modules and the tongue 11 are assembled). Compared with a manner in which both an upper row of terminals and a lower row of terminals are fixed to the tongue 11 in an insert molding manner, the molding manner of the present invention can ensure that the terminals are stably held and are not damaged on the tongue 11 (because two molds are required to position an upper row of terminals and a lower row of terminals when the upper and lower terminal modules and the tongue 11 are bonded in an insert molding manner, and the molds easily damage the terminals after pressing in a second-time molding process). Meanwhile, production costs are reduced in the molding manner of the present invention.

6. In the electrical connector formed in the present invention, the insulating body 1 to which the first terminal module 2 is held and the plastic block 32 to which the second terminal module 3 is held are bonded together in an assembly manner. For these two elements bonded in an assembly and locking manner, the upper shielding sheet 6 is laminated to the upper surface of the insulating body 1, the lower shielding sheet 7 is laminated to the lower surface of the plastic block 32, and the upper shielding sheet 6 and the lower shielding sheet 7 are in a snap-fit connection to each other, so that the insulating body 1 and the plastic block 32 can be firmly fixed together, and are not easily separated.

7. The depressed portions 601 and 701 on the upper shielding sheet 6 and the lower shielding sheet 7 connect the electrical connector and the grounding line of the mating connector as a whole to implement the shielding function thereof, and can further prevent the mating connector from withdrawing from the insertion space of the electrical connector.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electrical connector configured for insertion with a mating connector, the electrical connector comprising:
    an insulating body, having a base and a tongue extending forward from the base, the tongue having a middle portion and a mating portion, the middle portion being connected to the mating portion and the base, and a thickness of the middle portion being greater than that of the mating portion;
    a plurality of terminals having a plurality of connection portions, each of the terminals having one of the connection portions, and the connection portions being divided into an upper row and a lower row and fixed to the middle portion; and
    a middle shielding sheet, insert molded in the tongue and located between the connection portions in the upper row and the lower row, the middle shielding sheet having at least one first protruding portion extending out of a side edge of the middle portion.

2. The electrical connector of claim 1, wherein the at least one first protruding portion protrudes outward from a side edge of the middle shielding sheet.

3. The electrical connector of claim 1, wherein:
    the middle shielding sheet is insert molded into the mating portion and the middle portion;
    a second protruding portion protrudes outward from a side edge of the middle shielding sheet; and
    the second protruding portion is located in front of the at least one first protruding portion, and extends out of a side edge of the mating portion.

4. The electrical connector of claim 3, wherein a first space is located between the at least one first protruding portion and the second protruding portion adjacent to each other, and the first space is exposed from the side edge of the mating portion.

5. The electrical connector of claim 4, wherein the side edge of the middle shielding sheet defines a second space located behind the at least one first protruding portion and embedded into the insulating body.

6. The electrical connector of claim 5, wherein the second space is located closer to a central line of the middle shielding sheet along a front-rear direction than the first space.

7. The electrical connector of claim 1, wherein an upper shielding sheet is arranged on an upper surface of the middle portion, a lower shielding sheet is arranged on a lower surface of the middle portion, the upper shielding sheet has a snap-fit portion, the lower shielding sheet has a buckling portion, the snap-fit portion and the buckling portion are snap-fitted at the side edge of the middle portion, and the at least one first protruding portion is located in front of the snap-fit portion.

8. The electrical connector of claim 7, wherein a shielding case covers the base, the upper shielding sheet has an elastic sheet, the elastic sheet extends to the base and urges against the shielding case, the lower shielding sheet has an urging portion, and the urging portion and the shielding case are connected by spot welding.

9. The electrical connector of claim 1, wherein an elongated slot is depressed from an upper surface of the middle portion, and at least one of the connection portions is exposed from the elongated slot.

10. The electrical connector of claim 1, wherein a contact portion extends forward from one of the connection portions, the contact portion is exposed to the mating portion, the terminals in each row comprise a pair of high-speed terminals, and a width of the contact portion of each high-speed terminal is greater than that of the a corresponding connection portion.

11. The electrical connector of claim 10, wherein in the pair of high-speed terminals, a distance between the two contact portions is greater than a distance between the two connection portions.

12. The electrical connector of claim 10, wherein a non-high-speed terminal is provided at each side of two sides of the pair of high-speed terminals, and for each of the high-speed terminals, a distance between the contact portion of the high-speed terminal and the contact portion of the non-high-speed terminal adjacent to the high speed terminal is smaller than a distance between the connection portion of the high-speed terminal and the connection portion of the non-high-speed terminal adjacent to the high speed terminal.

13. The electrical connector of claim 1, wherein the mating portion has a front surface, and the middle shielding sheet extends beyond the front surface.

14. The electrical connector of claim 1, wherein two soldering pins bend and extend from the middle shielding sheet, the two soldering pins extend out of the base, a plurality of soldering portions extends backward from the connection portions respectively, the soldering portions are arranged in two rows and extend out of the base, and the two soldering pins are located at two sides of the soldering portions in the two rows.

15. The electrical connector of claim 1, wherein:
    each of the connection portions comprises a horizontal segment and a vertical segment bending down and extending from the horizontal segment;
    the horizontal segments are divided into two rows and fixed to the middle portion and the base;
    the vertical segments are divided into two rows and fixed to the base; and
    a bending portion bends and extends from the middle shielding sheet, and the bending portion is located between the vertical segments in the two rows.

16. The electrical connector of claim 1, wherein:
    the terminals in the lower row comprise a grounding terminal is located at an outermost side of the terminals in the lower row;
    an extending portion is connected to the grounding terminal and protrudes and extends out of the middle portion; and the extending portion and the at least one first protruding portion are staggered in a front-rear direction.

* * * * *